(12) United States Patent
Lee

(10) Patent No.: US 9,428,137 B2
(45) Date of Patent: Aug. 30, 2016

(54) SEAT CUSHION AIRBAG SYSTEM

(71) Applicant: HYUNDAI MOBIS CO., LTD., Seoul (KR)

(72) Inventor: Seok Min Lee, Yongin-si (KR)

(73) Assignee: HYUNDAI MOBIS Co., Ltd., Seoul (KR)

( * ) Notice: Subject to any disclaimer, the term of this patent is extended or adjusted under 35 U.S.C. 154(b) by 0 days.

(21) Appl. No.: 14/750,575

(22) Filed: Jun. 25, 2015

(65) Prior Publication Data
US 2016/0090058 A1 Mar. 31, 2016

(30) Foreign Application Priority Data

Sep. 26, 2014 (KR) .................. 10-2014-0128901

(51) Int. Cl.
| *B60R 21/16* | (2006.01) |
| *B60R 21/207* | (2006.01) |
| *B60N 2/42* | (2006.01) |
| *B60R 21/2334* | (2011.01) |
| *B60R 21/231* | (2011.01) |

(52) U.S. Cl.
CPC .............. *B60R 21/207* (2013.01); *B60N 2/42* (2013.01); *B60R 21/2334* (2013.01); *B60R 2021/23169* (2013.01)

(58) Field of Classification Search
CPC .................. B60R 21/207; B60R 2021/23146
USPC ............... 280/730.1, 730.2, 743.1, 743.2
See application file for complete search history.

(56) References Cited

U.S. PATENT DOCUMENTS

| 6,935,684 | B2* | 8/2005 | Sakai | B60N 2/4221 297/216.1 |
| 7,841,655 | B2* | 11/2010 | Yoshikawa | B60N 2/42763 280/728.2 |
| 8,573,633 | B2* | 11/2013 | Kino | B60N 2/42763 280/728.2 |
| 8,888,126 | B2* | 11/2014 | Nukaya | B60N 2/42718 280/730.1 |
| 9,033,364 | B2* | 5/2015 | Nukaya | B60R 21/207 280/728.1 |
| 9,126,510 | B2* | 9/2015 | Hirako | B60N 2/42763 |
| 2006/0119149 | A1* | 6/2006 | Yoshikawa | B60N 2/42718 297/216.1 |
| 2006/0267325 | A1* | 11/2006 | Kumagai | B60R 21/207 280/753 |
| 2007/0132214 | A1* | 6/2007 | Suzuki | B60N 2/42718 280/730.1 |
| 2009/0206582 | A1* | 8/2009 | Kumagai | B60N 2/42763 280/729 |
| 2013/0056964 | A1* | 3/2013 | Yamashita | B60N 2/42718 280/730.1 |
| 2013/0082457 | A1* | 4/2013 | Hashido | B60R 21/207 280/730.1 |

FOREIGN PATENT DOCUMENTS

KR 10-2005-0101394 A 10/2005

* cited by examiner

*Primary Examiner* — Toan To
(74) *Attorney, Agent, or Firm* — Knobbe Martens Olson & Bear LLP

(57) ABSTRACT

A seat cushion airbag system may include: a cushion body installed on a seat of a vehicle, unfolded by receiving gas from an inflator, and including a rear chamber which lifts the rear part of the body of a passenger and a front chamber which lifts the front part of the body of the passenger while inflating more than the rear chamber; and an unfolding restriction unit installed between the rear chamber and the front chamber, and having a vent hole through which gas is passed.

11 Claims, 6 Drawing Sheets

SEAT CUSHION AIRBAG SYSTEM

CROSS-REFERENCES TO RELATED APPLICATIONS

The present application claims priority to Korean application number 10-2014-0128901, filed on Sep. 26, 2014, which is incorporated by reference in its entirety.

BACKGROUND

The present disclosures relates to a seat cushion airbag system.

Although a passenger fastens a seat belt, the abdomen of the passenger may be pressurized by a wrap belt of the seat belt, which serves to tie the pelvis of the passenger, while the lower body of the passenger slides forward during a vehicle collision. In this case, the passenger could die. Such a phenomenon in which the lower body of the passenger is moved forward to destabilize the seating posture and behavior of the passenger during a vehicle collision is referred to as a submarine happening. The submarine happening may occur when a passenger wears a seat belt in a wrong way, for example, when the passenger loosely fastens the seat belt or excessively leans back in the seat. However, even when the passenger normally wears the seat belt, a submarine happening may occur due to the posture of the passenger during an accident.

The related technology is disclosed in Korean Patent Laid-open Publication No. 2005-0101394 published on Oct. 24, 2005 and entitled "Seat cushion structure having airbag system".

SUMMARY

Embodiments of the present invention are directed to a seat cushion airbag system which is capable of stably maintaining a state in which the body of a passenger is tied by a seat belt during a vehicle collision.

In one embodiment, a seat cushion airbag system may include: a cushion body installed on a seat of a vehicle, unfolded by receiving gas from an inflator, and including a rear chamber which lifts the rear part of the body of a passenger and a front chamber which lifts the front part of the body of the passenger while inflating more than the rear chamber; and an unfolding restriction unit installed between the rear chamber and the front chamber, and having a vent hole through which gas is passed.

The unfolding restriction unit may be formed in a panel shape so as to divide the rear chamber and the front chamber.

The inflator may be installed in the front chamber such that the rear chamber is unfolded more slowly than the front chamber.

The gas discharged from the inflator may flow toward the rear chamber through the vent hole via the front chamber.

The cushion body may include: a lower panel part coupled to the bottom of the unfolding restriction unit; an upper panel part positioned over the lower panel part, forming a chamber with the lower panel part, and coupled to the top of the unfolding restriction unit; and a sealing part sealing the edges of the lower panel part and the upper panel part.

The unfolding restriction unit may include: an inclined panel part installed at an angle while having a panel shape, and having the vent hole formed therein; a lower fixing part formed at the bottom of the inclined panel part and connected to the lower panel part; and an upper fixing part formed at the top of the inclined panel part, and connected to the upper panel part at the rear side from the lower fixing part.

The unfolding restriction unit may have an adjustable vertical length, and the level to which the cushion body is inflated upward may decrease as the vertical length of the unfolding restriction unit is reduced.

The vent hole may be formed through the lower part of the inclined panel part such that gas of the front chamber is introduced downward toward the rear chamber and flows along the lower panel part.

The unfolding restriction unit may include a plurality of vent holes which are formed so as to be isolated from each other in a lateral direction.

The plurality of vent holes may be formed in the inclined panel part so as to be arranged at the same distance from the lower fixing part.

The rear part of the body of the passenger may correspond to the hip of the passenger, and the front part of the body of the passenger may correspond to the thigh of the passenger.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
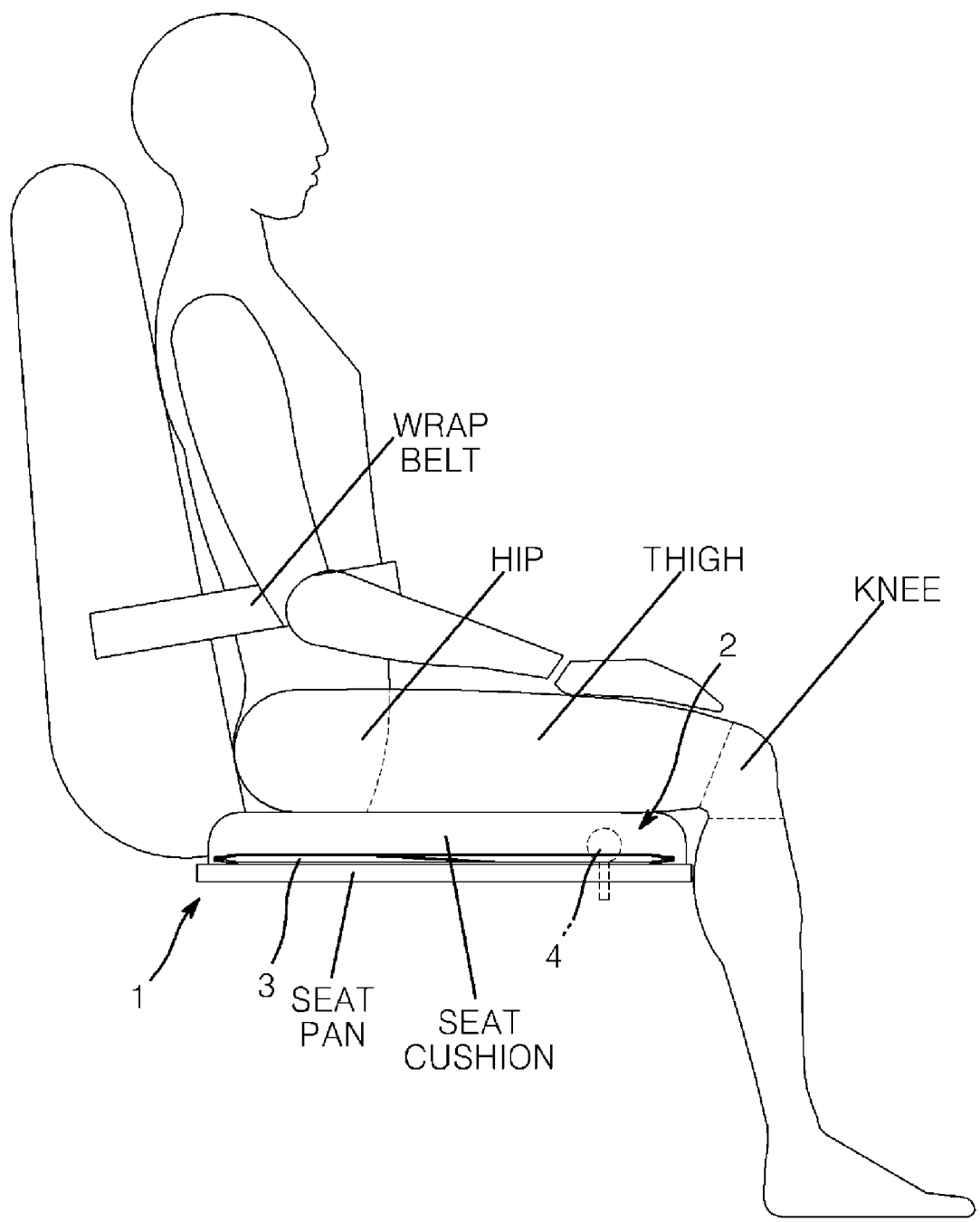
FIG. 1 is a side perspective view schematically illustrating a seat cushion airbag system in accordance with an embodiment of the present invention.
Figure 2:
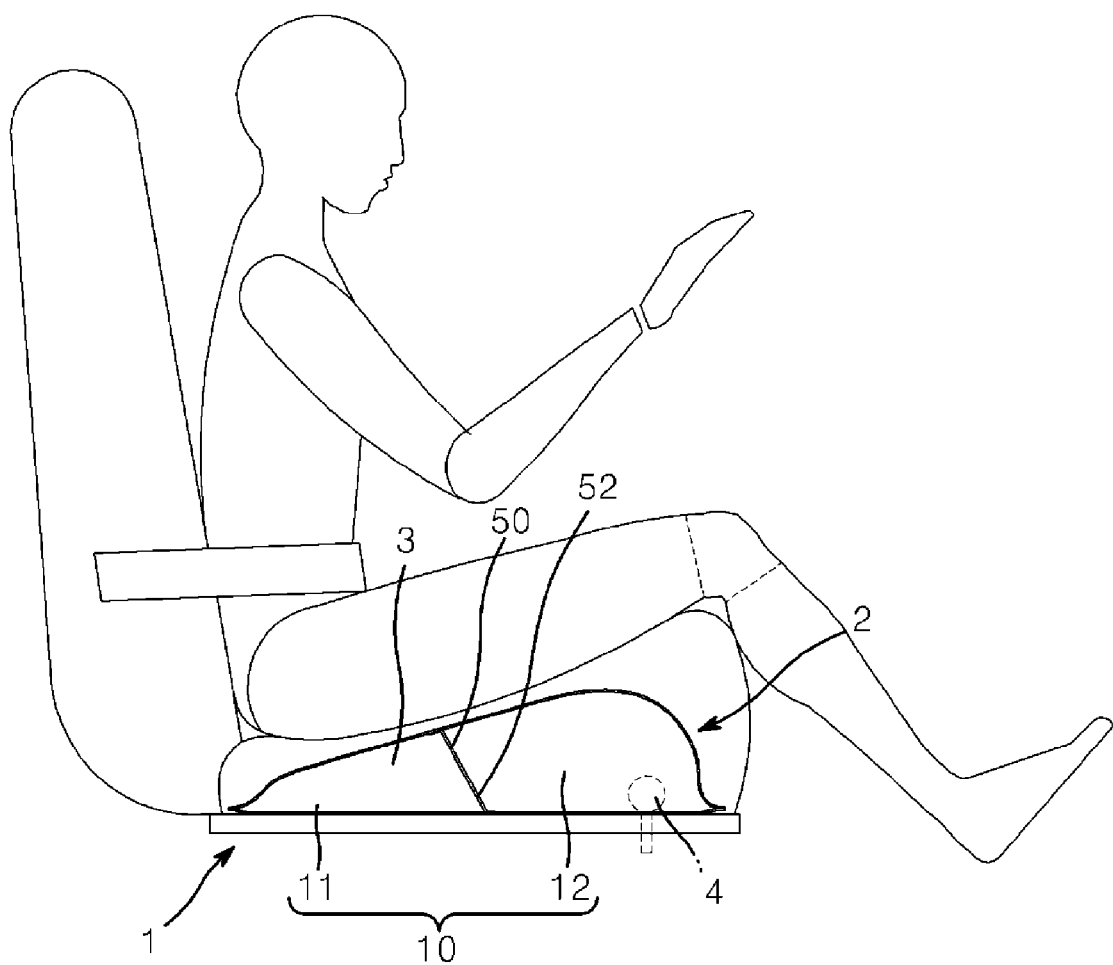
FIG. 2 is a side perspective view schematically illustrating a state in which a cushion of the seat cushion airbag system in accordance with the embodiment of the present invention is unfolded.

FIG. 1 is a side perspective view schematically illustrating a seat cushion airbag system in accordance with an embodiment of the present invention. FIG. 2 is a side perspective view schematically illustrating a state in which a cushion of the seat cushion airbag system in accordance with the embodiment of the present invention is unfolded.

Referring to FIG. 1, the seat cushion airbag system 2 to which the cushion 3 is applied may be installed on a seat 1 of a vehicle, on which the hip and thigh of a passenger are received. The seat 1 may include a seat pan and a seat cushion. The seat pan may form a framework to support the weight of the passenger, and the seat cushion may be installed over the seat pan and form a cushion to resiliently support the hip and thigh of the passenger.

The seat cushion airbag system 2 in accordance with the embodiment of the present invention may be installed between the seat pan and the seat cushion. Thus, when the vehicle collides, the cushion 3 of the seat cushion airbag system 2 may be inflated upward in a state where the lower part of the cushion 3 is supported by the seat pan, and push the seat cushion toward the passenger, as illustrated in FIG. 2.

The cushion 3 of the seat cushion airbag system 2 in accordance with the embodiment of the present invention may be installed to extend across the body part of the passenger, which comes in contact with the seat 1, or particularly the hip and thigh of the passenger. When the cushion 3 is unfolded, the cushion 3 may lift the hip and thigh of the passenger. At this time, as the pelvis of the passenger, which is a part of the hip, is lifted with the lower body of the passenger, the pelvis of the passenger may be prevented from escaping downward from a wrap belt, while being locked to the wrap belt.

The cushion 3 of the seat cushion airbag system 2 in accordance with the embodiment of the present invention may be expanded to lift the body of the passenger. At this time, the front part of the body may be lifted to a higher level than the rear part of the body. The rear part of the body of the passenger may correspond to the hip of the passenger, and the front part of the body of the passenger may correspond to the thigh of the passenger. Hereafter, for convenience of description, the rear part of the body of the passenger will be referred to as the hip, and the front part of the body of the passenger will be referred to as the thigh.

The cushion 3 of the seat cushion airbag system 2 in accordance with the embodiment of the present invention may be expanded to lift the body of the passenger. More specifically, the rear part of the body of the passenger may be lifted to a higher level than the front part of the body of the passenger, that is, the thigh and knee of the passenger may be lifted to a higher level than the hip of the passenger. Then, while the lower body of the passenger is folded upward, the passenger may be prevented from sliding toward the front side of the seat 1.

Through the above-described operation, the seat cushion airbag system 2 can prevent a submarine happening in which the lower body of the passenger is moved forward and the seating posture and behavior of the passenger are destabilized, during a vehicle collision. Furthermore, the seat cushion airbag system 2 can prevent the abdomen of the passenger from being pressurized by the wrap belt of the seat belt, which ties the pelvis of the passenger, while the lower body of the passenger is moved forward during a vehicle collision.

Figure 3:
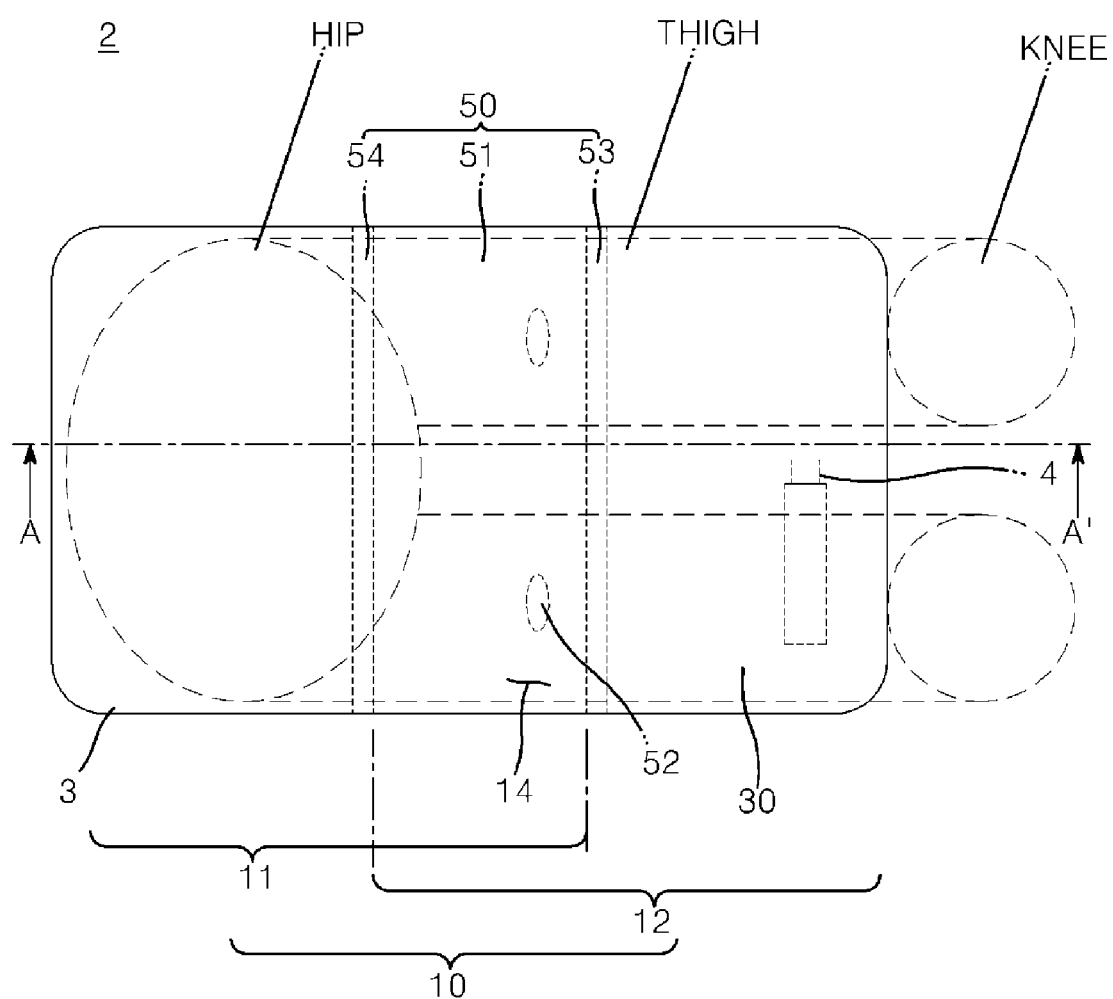
FIG. 3 is a plan perspective view schematically illustrating the cushion of the seat cushion airbag system in accordance with the embodiment of the present invention.
Figure 4:
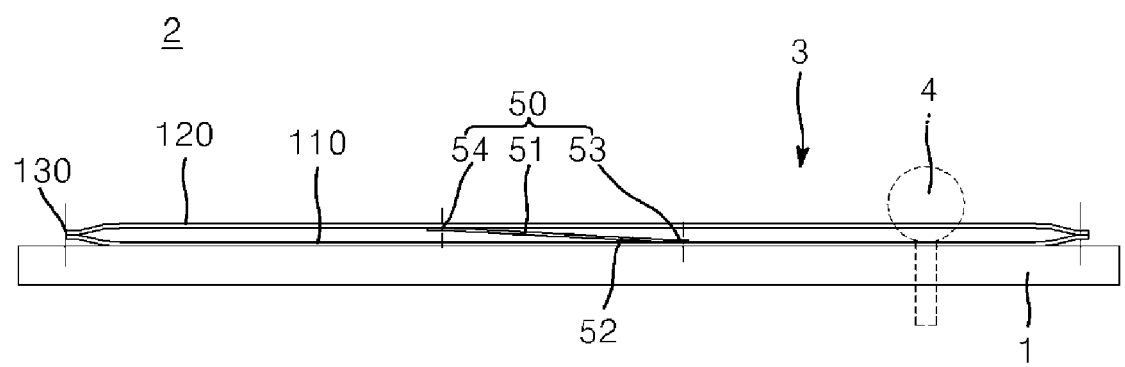
FIG. 4 is a cross-sectional view of the cushion of the seat cushion airbag system in accordance with the embodiment of the present invention, taken along line A-A' of FIG. 3.
Figure 5:
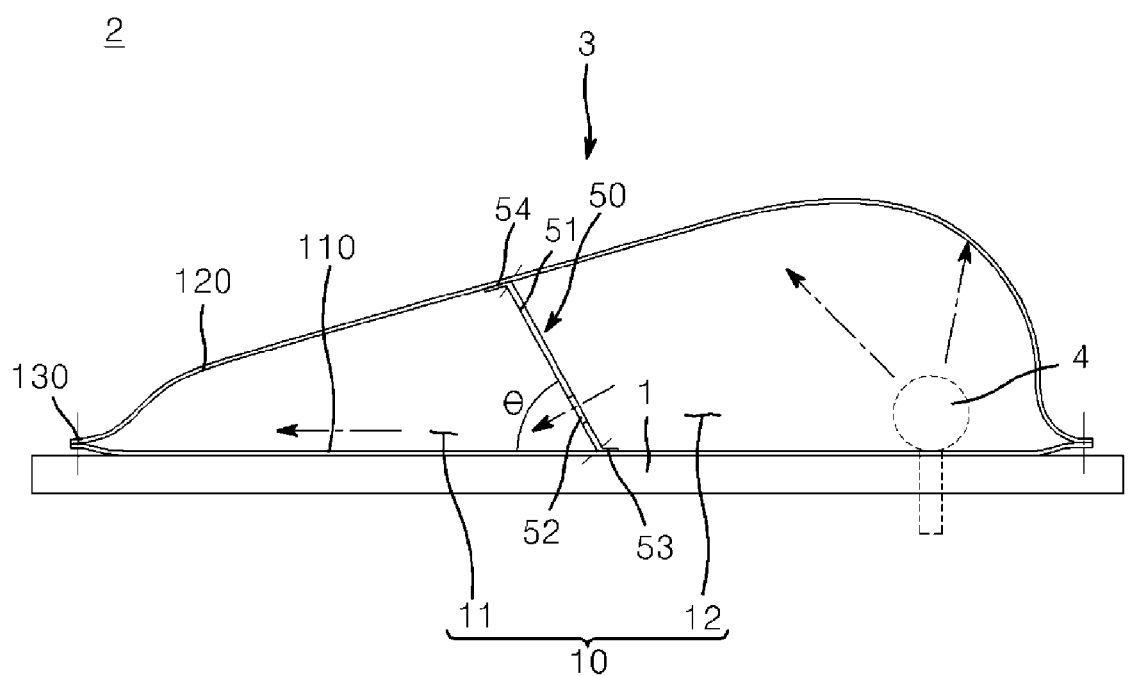
FIG. 5 is a cross-sectional view schematically illustrating a state in which the cushion of the seat cushion airbag system in accordance with the embodiment of the present invention is unfolded.
Figure 6:
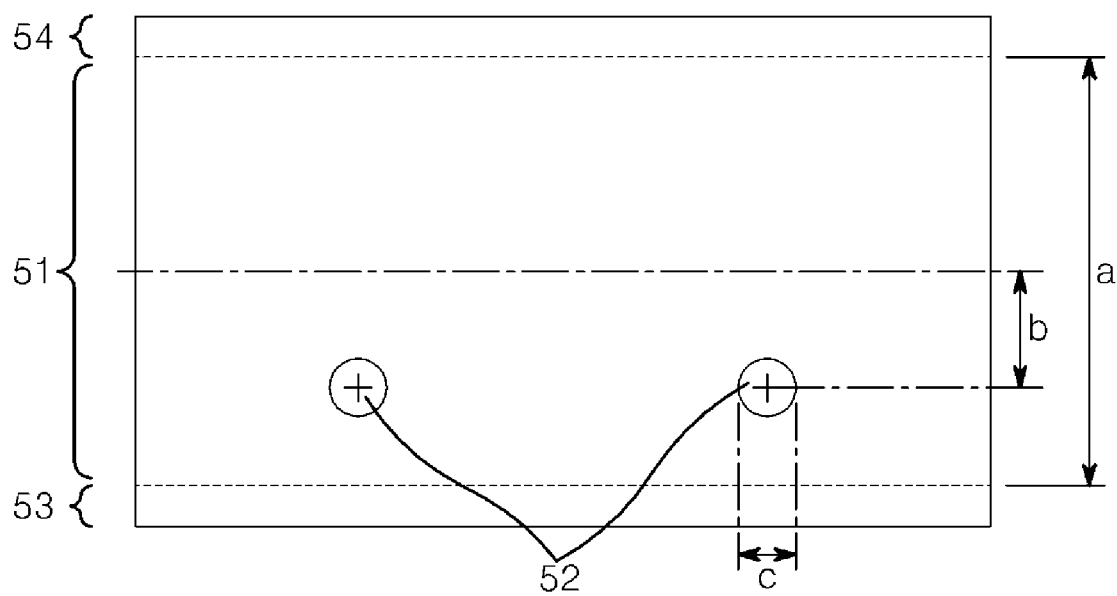
FIG. 6 is a front view schematically illustrating an unfolding restriction unit in accordance with the embodiment of the present invention.

FIG. 3 is a plan perspective view schematically illustrating the cushion of the seat cushion airbag system in accordance with the embodiment of the present invention. FIG. 4 is a cross-sectional view of the cushion of the seat cushion airbag system in accordance with the embodiment of the present invention, taken along line A-A' of FIG. 3. FIG. 5 is a cross-sectional view schematically illustrating a state in which the cushion of the seat cushion airbag system in accordance with the embodiment of the present invention is unfolded. FIG. 6 is a front view schematically illustrating an unfolding restriction unit in accordance with the embodiment of the present invention.

Referring to FIGS. 3 and 5, the cushion 3 of the seat cushion airbag system 2 in accordance with the embodiment of the present invention may include a cushion body 10 and an unfolding restriction unit 50.

The cushion body 10 may be unfolded by receiving gas from an inflator 4 during a vehicle collision, and lift the hip and thigh of the passenger. The cushion body 10 may be installed over the seat 1 of the vehicle so as to extend across the hip and thigh of the passenger.

The cushion body 10 may include a rear chamber 11 and a front chamber 12. The rear chamber 11 may lift the hip of the passenger when the cushion body 10 is unfolded, and the front chamber 12 may lift the thigh and knee of the passenger while inflating more than the rear chamber 11.

Thus, when the vehicle collides, the front chamber 12 may be inflated more than the rear chamber 11 such that the thigh and knee of the passenger may be lifted to a higher level than the hip of the passenger. At this time, since the hip of the passenger is moved upward toward the wrap belt while the knee of the lower body of the passenger is lifted toward the upper body of the passenger, it is possible to stably prevent the pelvis of the passenger from escaping downward from the wrap belt.

The inflator 4 may generate gas to inflate the cushion body 10, when the vehicle collides. The inflator 4 may be installed on the front chamber 12 through an inflator fixing bracket.

The inflator fixing bracket may include a mounting part and a stud part. The mounting part may be connected to the inflator 4 while surrounding the inflator 4 having a cylindrical shape or bar shape, and the stud part may be formed to protrude from the mounting part and fixed on the seat pan through the cushion body 10 while.

As the inflator 4 is installed on the front chamber 12, gas discharged from the inflator 4 may flow toward the rear chamber 11 through the front chamber 12. Thus, since the front chamber 12 is more rapidly inflated to lift the thigh and knee of the passenger, it is possible to more efficiently prevent a submarine happening in which the lower body of the passenger slides forward.

Furthermore, since the rear chamber 11 is unfolded more slowly than the front chamber 12 while the gas flows toward the rear chamber 11 from the front chamber 12, is it possible to prevent an impact which may be applied to the passenger when the front chamber 12 and the rear chamber 11 are rapidly inflated at the same time.

The unfolding restriction unit 50 may not only limit the unfolding height of the cushion body 10, but also divide the rear chamber 11 and the front chamber 12. The unfolding restriction unit 50 having a panel shape may be installed between the rear chamber 11 and the front chamber 12. The unfolding restriction unit 50 may have a vent hole 52 through which gas can be passed. Thus, the gas of the front chamber 12 may flow toward the rear chamber 11 through the vent hole 52.

The cushion body 10 in accordance with the embodiment of the present invention may include a lower panel part 110, an upper panel part 120, and a sealing part 130. The unfolding restriction unit 50 having a panel shape may be installed at an angle between the lower panel part 110 and the upper panel part 120.

The lower panel part 110 may be formed to extend from the hip to the thigh of the passenger. The upper panel part 120 may be formed over the lower panel part 110 so as to overlap the lower panel part 110. The sealing part 130 may seal the edges of the lower panel part 110 and the upper panel part 120. The sealing part 130 may be formed by coupling the edges of the lower panel part 110 and the upper panel part 120 through sewing or adhesion.

The lower panel part 110 and the upper panel part 120 may form a chamber which can be filled with gas in a state where the edge thereof is sealed by the sealing part 130. The front chamber 12 and the rear chamber 11 may be formed at the front and rear parts of the chamber formed by the lower panel part 110 and the upper panel part 120 so as to communicate with each other.

More specifically, the front chamber 12 may be formed at the front of the unfolding restriction unit 50, and the rear chamber 11 may be formed at the rear of the unfolding restriction unit 50. The front chamber 12 and the rear chamber 11 may be connected to communicate through the vent hole 52.

When the cushion body 10 is unfolded, the unfolding restriction unit 50 may be erected at an angle in a state where the top and bottom thereof are fixed to the upper and lower panel parts 120 and 110, respectively. The cushion body 10 may be unfolded while inflating upward. As the unfolding restriction unit 50 is formed between the front chamber 12 and the rear chamber 11, the unfolding height of the cushion body 10 may be limited to an interval corresponding to a distance between the top and bottom of the unfolding restriction unit 50.

For example, as the length of the unfolding restriction unit 50 is decreased, the unfolding height of the cushion body 10 may gradually decrease. As such, the unfolding restriction unit 50 may be formed to adjust the unfolding height of the cushion body 10.

When the unfolding restriction unit 50 is formed, the unfolding height of the cushion body 10 can be adjusted to a lower level as described above. Thus, the unfolding restriction unit 50 can prevent the passenger from bumping the head against the roof or sun visor of the vehicle when the hip and lower body of the passenger is excessively lifted. Furthermore, the unfolding restriction unit 50 can prevent the damage in lower body of the passenger, which may occur when the lower body is excessively caught in the wrap belt.

The unfolding restriction unit 50 in accordance with the embodiment of the present invention may be formed to divide the rear chamber 11 and the front chamber 12. Thus, as the unfolding restriction unit 50 is placed at the rear side, the front chamber 12 may be inflated to a higher level than the rear chamber 11. Depending on the formation position of the unfolding restriction unit 50, the unfolding heights of the rear chamber 11 and the front chamber 12 may differ.

The unfolding restriction unit 50 in accordance with the embodiment of the present invention may include an inclined panel part 51, a lower fixing part 53, and an upper fixing part 54.

The inclined panel part 51 may have a panel shape, and installed at an angle between the upper panel part 120 and the lower panel part 110. The vent hole 52 may be formed through the lower part of the inclined panel part 51.

When gas is discharged from the inflator 4, the inclined panel part 51 may be gradually erected while the front chamber 12 is filled with gas. Simultaneously, as the vent hole 52 formed in the inclined panel part 51 is gradually isolated from the upper panel part 120 and the lower panel part 110, gas can pass through the vent hole 52. Thus, the front chamber 12 may be preferentially unfolded, and the rear chamber 11 may be then unfolded by the transfer of gas through the vent hole 52.

As the vent hole 52 is formed at the lower part of the inclined panel part 51, the gas of the front chamber 12 may be introduced downward toward the rear chamber 11 through the vent hole 52, and flow along the seat pan and the lower panel part 110 in the rear chamber 11.

As the gas flows downward toward the rear chamber 11, the rear chamber 11 may be unfolded more slowly than when the gas is introduced to the upper part of the rear chamber or introduced upward. Therefore, the rear chamber 11 may be more slowly unfolded at a smaller height than the front chamber 12.

In the embodiment of the present invention, a plurality of vent holes 52 may be arranged so as to be isolated from each other in a lateral direction. The plurality of vent holes 52 may be positioned at the same level. In embodiments, the plurality of vent holes 52 formed in the inclined panel part 51 may be arranged at the same distance from the lower fixing part 53. Thus, when the same flow rate of gas is intended to be supplied toward the rear chamber 11 through the vent hole 52, gas may be uniformly introduced across the left and right parts of the rear chamber 11, compared to when one vent hole 52 having a larger size is formed.

Therefore, since the left and right hips can be simultaneously lifted to the same level in a state where the seat cushion airbag system is inflated, it is possible to prevent the body of the passenger from leaning to the left or right side. For reference, the width of the vent hole 52 is represented by c in FIG. 6.

In the embodiment of the present invention, the inclined panel part 51 may have a vertical length of 8 to 16 cm, and the vent hole 52 may be formed at a distance of 2 to 5 cm from the middle of the inclined panel part 51. For reference, the vertical length of the inclined panel part 51 is represented by a in FIG. 6, and the distance to the vent hole 52 from the middle of the inclined panel part 51 is represented by b in FIG. 6. For example, a may be set to 12 cm, b may be set to 3 cm, and c may be set to 3 cm.

The lower fixing part 53 may be formed at the bottom of the inclined panel part 51, and connected to the lower panel part 110 through sewing or adhesion. The upper fixing part 54 may be formed at the top of the inclined panel part 51, and connected to the upper panel part 120 at the rear side from the lower fixing part 53 through sewing or adhesion.

As the upper fixing part 54 is positioned at rear side from the lower fixing part 53, the inclined panel part 51 may be inclined downward toward the front side when the cushion is unfolded. Thus, the front chamber 12 positioned at the front of the unfolding restriction unit 50 may be naturally positioned over the rear chamber 11 positioned at the rear of the unfolding restriction unit 50, and the front chamber 12 may be inflated upward more than the rear chamber 11.

The inclined panel part 51 in accordance with the embodiment of the present invention may be erected at an angle of 30 to 70° when the cushion is unfolded. For reference, the angle of the inclined panel part 51 is represented by θ in FIG. 6. When the inclined panel part 51 has an angle lower than 30° under the supposition that the inclined panel part 51 is positioned in the middle of the cushion body 10, gas may not smoothly flow from the front chamber 12 toward the rear chamber 11.

Furthermore, when the inclined panel part 51 has an angle larger than 70°, a difference in unfolding height between the front chamber 12 and the rear chamber 11 may be imperceptible, and gas may not flow downward while more rapidly flowing toward the rear chamber 11. Thus, the rear chamber 11 may be more rapidly unfolded upward.

As the inclined panel part 51 has an angle of 30 to 70°, the front chamber 12 and the rear chamber 11 may be positioned at the top and bottom of the inclined panel part 51 such that the front chamber 12 is naturally unfolded to a higher level than the rear chamber 11.

Furthermore, as the rear chamber 11 is induced to be unfolded more slowly than the front chamber 12, the front chamber 12 may preferentially lift the knee of the passenger, and the rear chamber 11 may then push the hip of the passenger toward the wrap belt, thereby making it possible to more efficiently prevent a submarine happening in which the lower body slides forward.

In the cushion 3 of the seat cushion airbag system 2 in accordance with the embodiment of the present invention, the front chamber 12 may be inflated more than the rear chamber 11 when the vehicle collides. Then, the thigh and knee of the passenger may be lifted to a higher level than the hip of the passenger.

Therefore, since the hip is lifted toward the wrap belt at the same as the knee of the passenger is lifted toward the upper body, the seat cushion airbag system can prevent a submarine happening in which the pelvis of the passenger escapes downward from the wrap belt. Furthermore, the seat cushion airbag system can stably maintain a state in which the body of the passenger is tied by the seat belt.

Furthermore, as the unfolding restriction unit 50 is formed, the unfolding height of the cushion body 10 can be adjusted to a lower level. Thus, the unfolding restriction unit 50 can prevent the passenger from bumping the head against the roof or sun visor of the vehicle when the hip and lower body of the passenger is excessively lifted. Furthermore, the unfolding restriction unit 50 can prevent the damage in lower body of the passenger, which may occur when the lower body is excessively caught in the wrap belt.

Furthermore, as the inflator 4 is installed on the front chamber 12, the front chamber 12 may be more rapidly inflated to lift the thigh and knee of the passenger. Thus, the seat cushion airbag system can more efficiently prevent a submarine happening in which the lower body of the passenger slides forward.

Furthermore, since gas is passed toward the rear chamber 11 from the front chamber 12 such that the rear chamber 11 is unfolded more slowly than the front chamber 12, the seat cushion airbag system can prevent an impact which may be applied to the passenger when the front chamber 12 and the rear chamber 11 are rapidly inflated at the same time.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A seat cushion airbag system comprising:
    a cushion body installed on a seat of a vehicle, unfolded by receiving gas from an inflator, and comprising a rear chamber which lifts the rear part of the body of a passenger and a front chamber which lifts the front part of the body of the passenger while inflating more than the rear chamber; and
    an unfolding restriction unit installed between the rear chamber and the front chamber, and having a vent hole through which gas is passed.

2. The seat cushion airbag system of claim 1, wherein the unfolding restriction unit is formed in a panel shape so as to divide the rear chamber and the front chamber.

3. The seat cushion airbag system of claim 1, wherein the inflator is installed in the front chamber such that the rear chamber is unfolded more slowly than the front chamber.

4. The seat cushion airbag system of claim 3, wherein gas discharged from the inflator flows toward the rear chamber through the vent hole via the front chamber.

5. The seat cushion airbag system of claim 1, wherein the cushion body comprises:
    a lower panel part coupled to the bottom of the unfolding restriction unit;
    an upper panel part positioned over the lower panel part, forming a chamber with the lower panel part, and coupled to the top of the unfolding restriction unit; and
    a sealing part sealing the edges of the lower panel part and the upper panel part.

6. The seat cushion airbag system of claim 5, wherein the unfolding restriction unit comprises:
    an inclined panel part installed at an angle while having a panel shape, and having the vent hole formed therein;
    a lower fixing part formed at the bottom of the inclined panel part and connected to the lower panel part; and
    an upper fixing part formed at the top of the inclined panel part, and connected to the upper panel part at the rear side from the lower fixing part.

7. The seat cushion airbag system of claim 6, wherein the unfolding restriction unit has an adjustable vertical length, and the level to which the cushion body is inflated upward decreases as the vertical length of the unfolding restriction unit is reduced.

8. The seat cushion airbag system of claim 6, wherein the vent hole is formed through the lower part of the inclined panel part such that gas of the front chamber is introduced downward toward the rear chamber and flows along the lower panel part.

9. The seat cushion airbag system of claim 1, wherein the unfolding restriction unit comprises a plurality of vent holes which are formed so as to be isolated from each other in a lateral direction.

10. The seat cushion airbag system of claim 9, wherein the plurality of vent holes are formed in the inclined panel part so as to be arranged at the same distance from the lower fixing part.

11. The seat cushion airbag system of claim 1, wherein the rear part of the body of the passenger corresponds to the hip of the passenger, and the front part of the body of the passenger corresponds to the thigh of the passenger.

* * * * *